Figure 1:
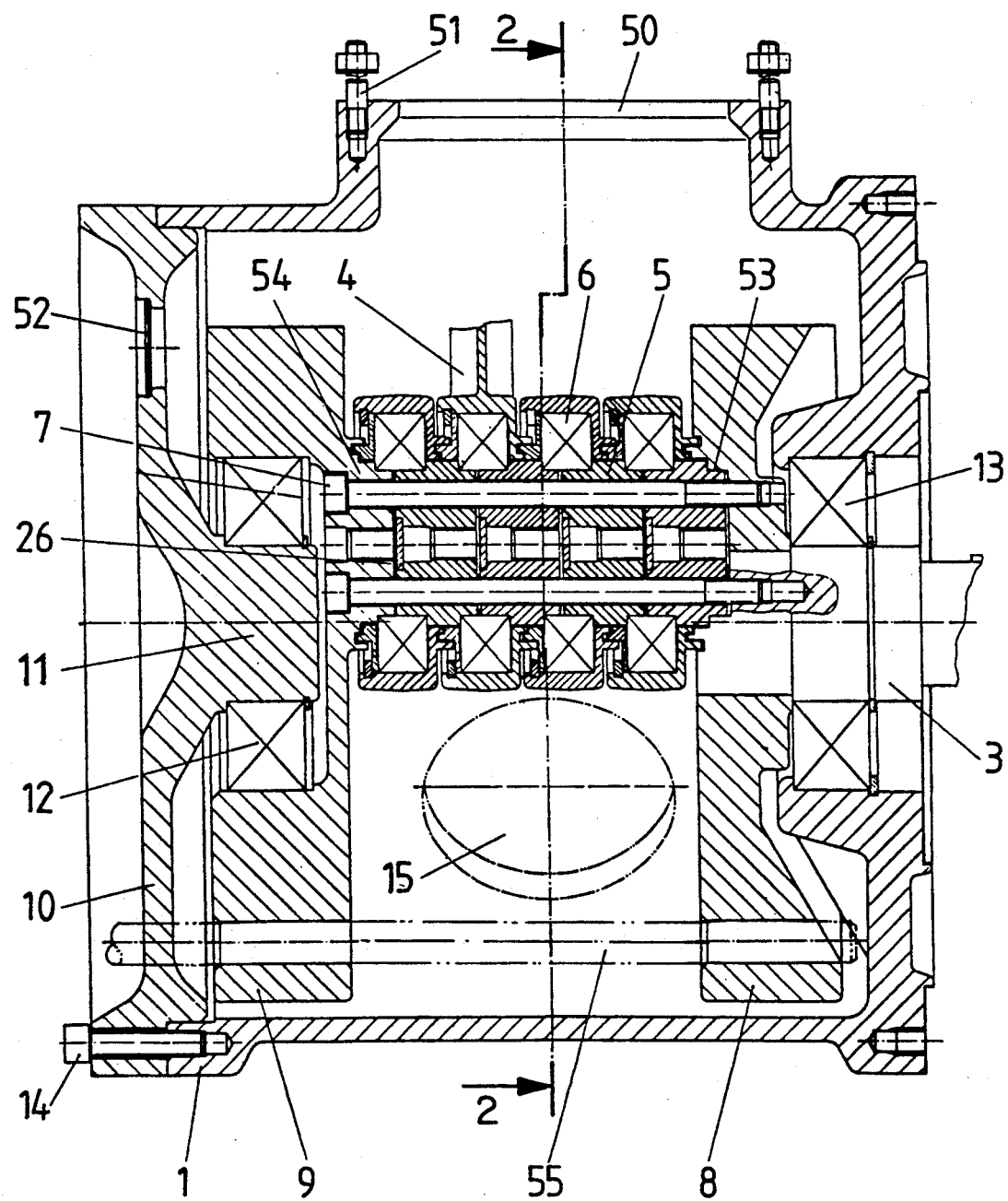

United States Patent [19]
Wanner

[11] Patent Number: 5,195,420
[45] Date of Patent: Mar. 23, 1993

[54] PISTON COMPRESSOR, PARTICULARLY AN OIL-FREE PISTON COMPRESSOR

[75] Inventor: Hans Wanner, Herisau, Switzerland

[73] Assignee: Fritz Haug AG, St. Gallen, Switzerland

[21] Appl. No.: 850,265

[22] Filed: Mar. 12, 1992

[30] Foreign Application Priority Data

Mar. 12, 1991 [CH] Switzerland .......................... 737/91

[51] Int. Cl.[5] ................................................ F01B 1/00
[52] U.S. Cl. .......................................... 92/72; 92/147;
  92/157; 184/105.1; 184/5.1; 123/55 A; 74/597
[58] Field of Search ...................... 92/72, 73, 153, 157,
  92/147; 184/105.1, 105.2, 105.3, 5.1; 123/197.4,
  55 A; 74/596, 597, 598

[56] References Cited

U.S. PATENT DOCUMENTS

| 1,633,770 | 3/1927 | Christensen. |
| 1,998,083 | 4/1935 | Grob et al. . |
| 3,426,616 | 2/1969 | Van Der Winden ................. 74/598 |
| 3,903,992 | 9/1975 | Chivukula et al. ................. 184/5.1 |

FOREIGN PATENT DOCUMENTS

| 934801 | 11/1937 | Fed. Rep. of Germany . |
| 0169719 | 8/1968 | Fed. Rep. of Germany ........ 74/598 |
| 0064726 | 11/1982 | Fed. Rep. of Germany .......... 92/72 |
| 0620476 | 4/1927 | France ............................. 184/105.1 |
| 0195159 | 3/1923 | United Kingdom .................. 74/597 |
| 0399103 | 9/1933 | United Kingdom .................. 74/598 |

Primary Examiner—Thomas E. Denion
Attorney, Agent, or Firm—Shoemaker and Mattare, Ltd.

[57] ABSTRACT

The crank mechanism of the piston compressor comprises individual crank disks (5), which each support on their outer circumference a rolling bearing (6) for the bearing of a connecting rod (4). The crank disks (5) are pressed together to form a package by means of tensioning bolts (7). The crank case (1) is preferably closed off by a case cover (10), the inside of which is formed as a bearing mount for the crank mechanism. Assembly and disassembly of a crank mechanism of this type is particularly simple and efficient and can be undertaken by personnel who are not specially trained. In addition, special relubrication devices provide simple and error free servicing, and thus greater longevity.

15 Claims, 5 Drawing Sheets

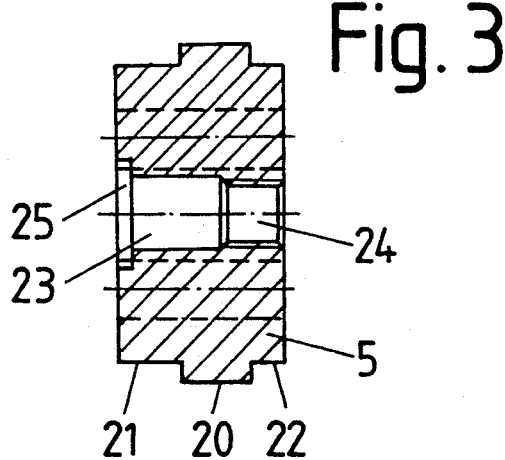
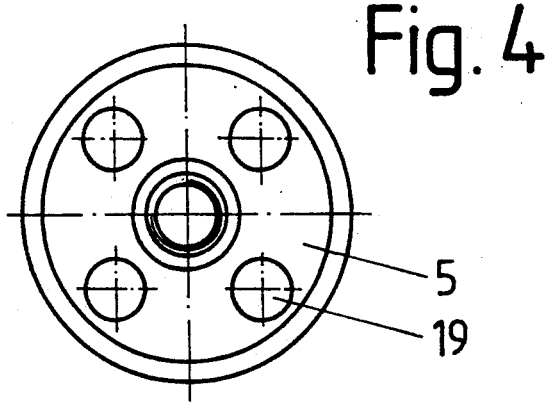
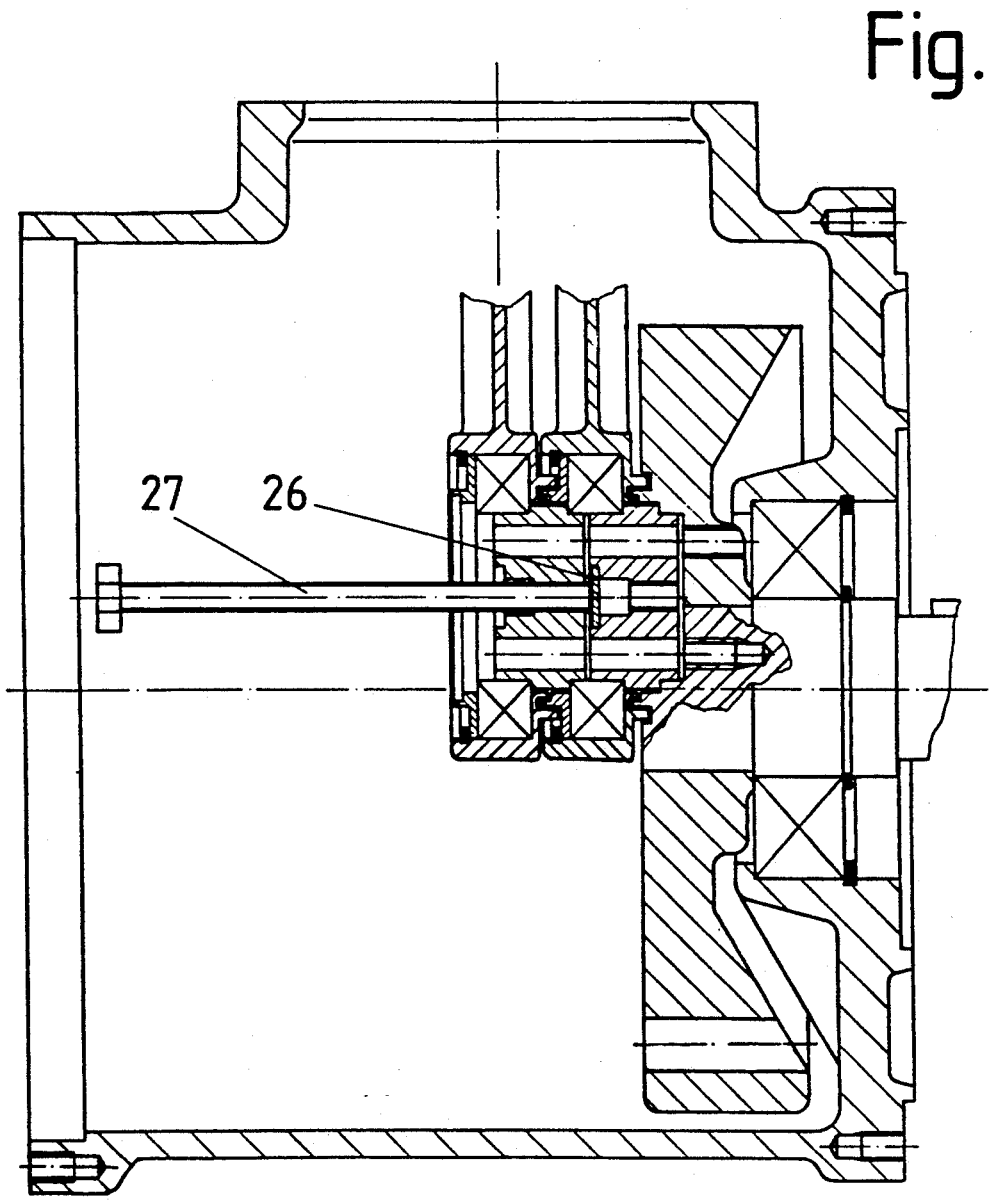

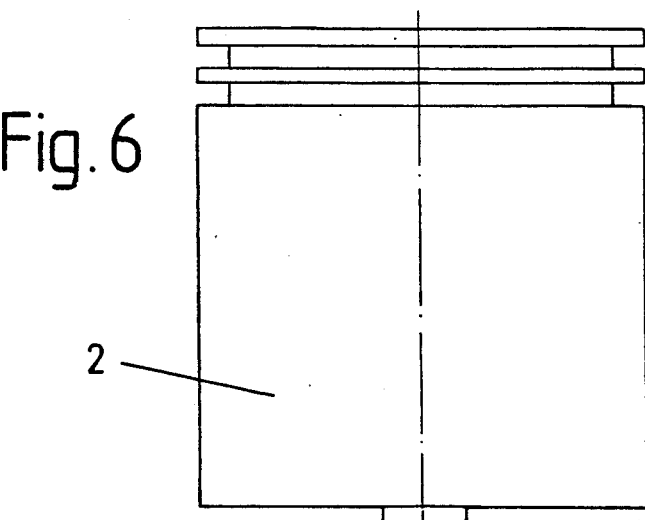
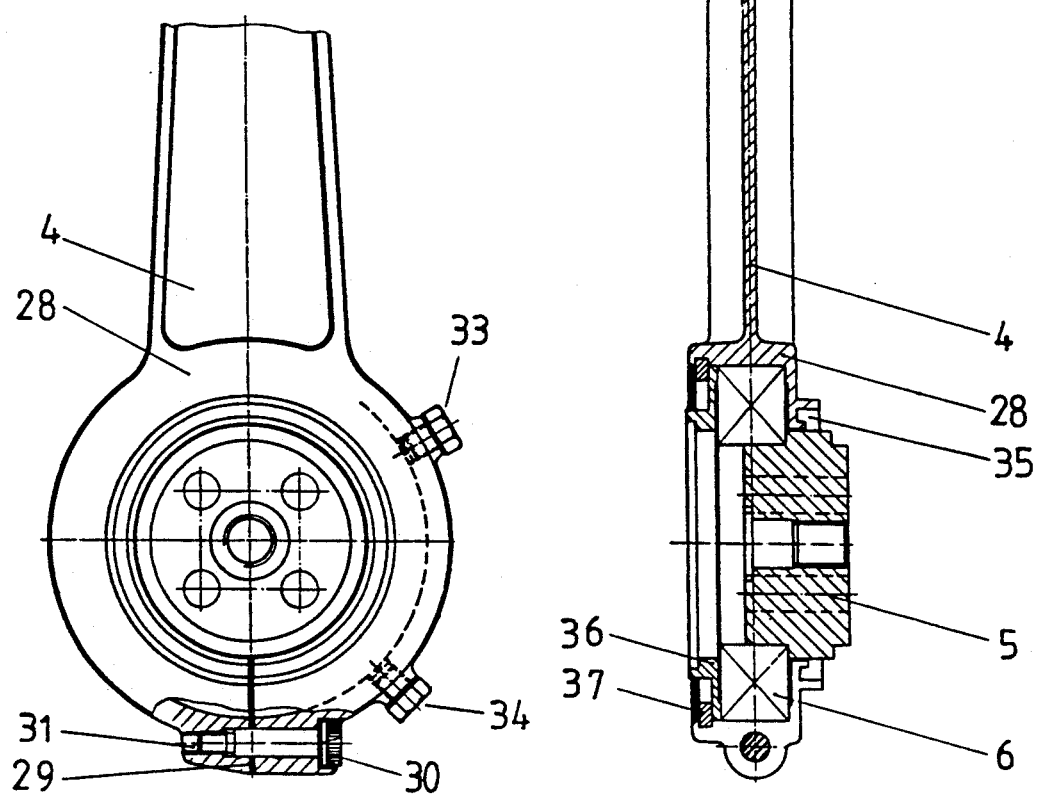

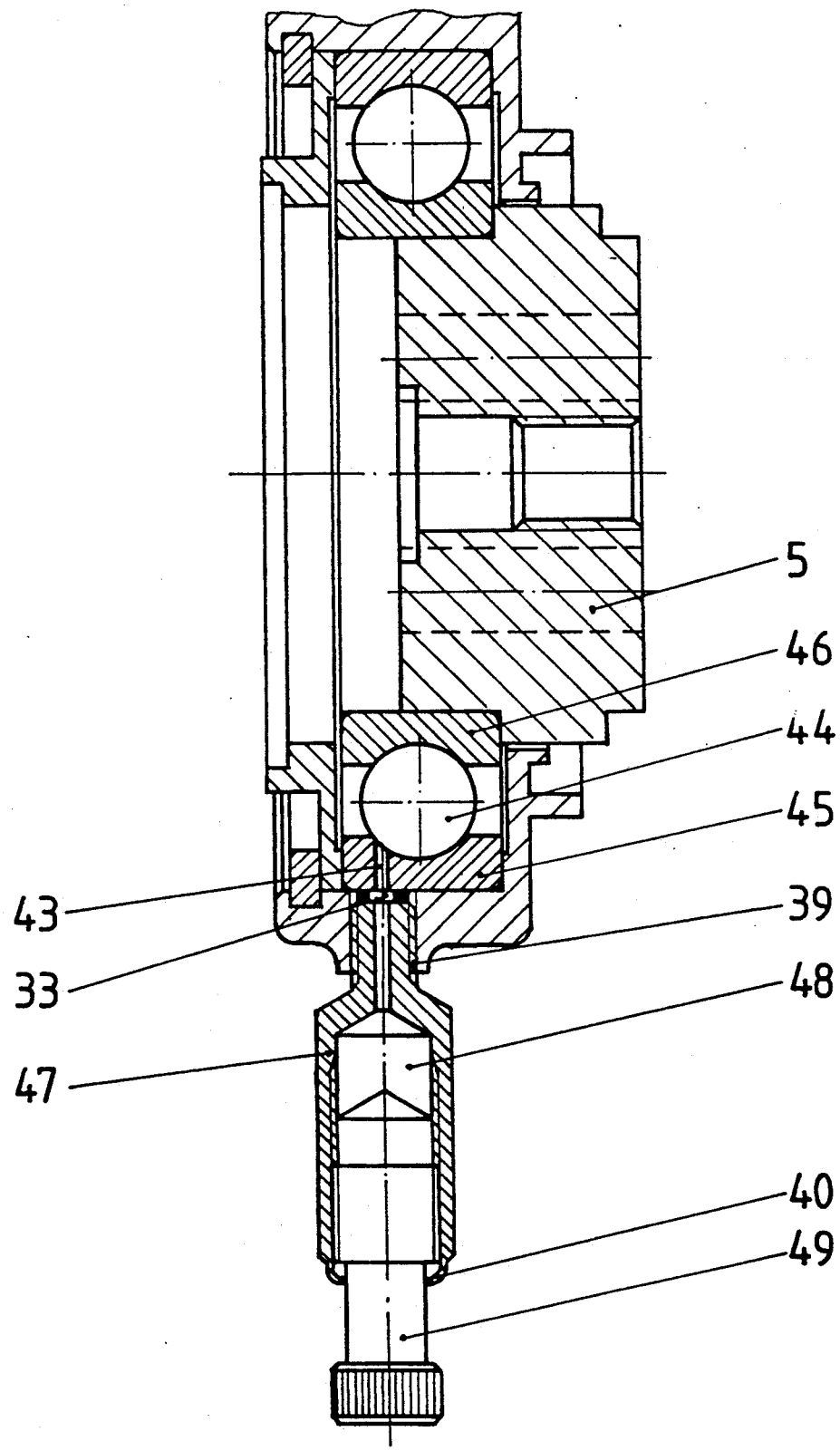

PISTON COMPRESSOR, PARTICULARLY AN OIL-FREE PISTON COMPRESSOR

The invention concerns a piston compressor, in particular an oil-free piston compressor according to the preamble of claim 1. These types of compressors are employed for the compression of air and other gaseous mediums, everywhere where purity is of the greatest priority—for example, in the medical area, in foodstuff technology or with gases, oxygen for example, which react chemically when contaminated by oil.

Although satisfactorily functioning oil-free gas compressors have been known for many years, the conventional construction continues to give rise to certain problems with regard to servicing. In this respect, the "once only" lubricated rolling bearings must be completely replaced, in part together with other components, after reaching their anticipated life span. A relatively longterm wringing fit can give rise to corrosion of the contacting surfaces, as a result of which the replacement of the parts necessitates special extraction and pressing tools. As a result, revision of the machine on the spot can be partly hindered or rendered impossible. Relatively high labour and spare part costs can ensue. It is therefore a purpose of the invention to create a piston compressor of the type mentioned in the introduction with which the assembly and servicing effort can be considerably reduced. This purpose is fulfilled, according to the invention, with a piston compressor which possesses the features in claim 1.

Compound crank mechanisms on piston machines, with respectively a single crank disk, are indeed known, as can be observed in U.S. Pat. No. 1,998,083. Here, however, tensioning is always by means of a single tensioning bolt in the axis of the drive shaft or in the axis of the crank disk, which is inefficient as far as forces are concerned. In the case of the solution according to the invention, a rigid, compact connection is achieved, with the centre of the crank disks remaining free.

The disk type construction of the crank shaft is identical for two, three and four cylinder machines, so that spare parts can be highly standardised. Disassembly of the individual piston sets (including pistons, gudgeon pins, little end bearings, connecting rods and big end bearings and crank disks) is simple, as is re-assembly. The crank disks are firmly connected, for example by an interference fit, with the rolling bearings and connecting rods allocated to them. The unit which is formed in this way can be assembled and disassembled with simple mechanical aids, i.e. drawing on, respectively separation by pressing. This work can, in any given case, be undertaken on the spot with the aid of hand tools.

The tensioning bolts are, with particular advantage, able to be screwed into the drive shaft and/or a first crank web fixed to the drive shaft. For disassembly of the crank mechanism, merely the tensioning bolts must thus be released in order to to be able to remove the individual crank disks with the connecting rods and rolling bearings and pistons attached to them. The tensioning bolts, preferably three or more of them and arranged parallel to one another, permit a rigid and vibration free arrangement of the disk formed crank shaft. As an aid to assembly, threaded rods with free rotating nuts, which compensate for the differing lengths relating to the number of cylinders, can be used in place of tensioning bolts with advantage.

A rod with a ground finish, which is inserted into both of the crank webs and into corresponding bores, provides exact angular congruence of the crank webs, and with that, the opposing bearing. The combination of these devices is complemented by a simple makeshift suspension system for the outer crank web. The crank webs are preferably formed as flywheels. The combination of these devices enables rapid, simple disassembly and absolutely exact reassembly, on the spot, by personnel who are not specially trained. The flywheels, arranged on both sides, provide optimal vibration compensation as is generally known. This is a further advantage, since with conventional types of construction this counter balance is mostly omitted due to difficulties of assembly.

Further advantages can be aimed at if the crank case is able to be closed off with a case cover in the drive shaft axis, the inside of which is formed as a bearing mount for the crank shaft. At the same time it is practical if a second crank web, respectively a second flywheel, is mounted on bearings on the inside of the case cover and if the crank disks are fixed and centred in relation to one another between the first and the second flywheel.

Preferably the rolling bearings are arranged on the crank disks in such a way that they serve as centering and spacing elements and that the pressing force of the tensioning bolts is transmitted through the rolling bearings.

During disassembly, considerable advantages can be aimed at if each crank disk possesses in its centre a bore, with a threaded section, the bore being able to be closed off on its face with an disassembly disk insert. Thus, an auxiliary bolt can be screwed in which comes up against the disassembly disk. This disk, in turn, closes off the bore of the next crank disk so that the crank disk gripped by the auxiliary bolt can be extracted in the simplest way. The disassembly disks are loosely inserted in each individual crank disk and do not disturb the operation of the compressor in any way.

The connecting rods possess, with advantage, a big end collar with a radial slit, a tensioning bolt which runs tangentially being arranged in the area of the slit with which the big end collar is able to be clamped onto the rolling bearing which is allocated to it. In this way the connecting rods are able to be connected firmly to the rolling bearings in a particularly simple way in order to form the unit, comprising crank disks, rolling bearings and connecting rods, mentioned in the introduction. The rolling bearings, with their minimal tolerances, are ideally suited to very accurate continuous centering of the crank disks. In addition, they can be assembled and disassembled more easily than some or other type of snug fitting which possesses greater tolerances. Combined with the particularly easily assembled and disassembled crank shaft, this enables simple replacement of the worn rolling bearings on the spot, and without special tools such as presses, etc. This type of rolling bearing mounting renders pressing, heating, and hammering etc unnecessary and ensures an exact facing stop of the new bearing by means of the lateral shoulders. This task, too, can be accomplished quickly and reliably by a non-specialist.

Maintenance costs, in relation to the total life span of the compressor, can be considerably reduced if each connecting rod big end collar possesses, on its outer edge, a radial lubrication hole to which a lubrication device can be applied and via which a lubricant can be directly fed to the rolling bearing. Although the bearings are life lubricated with a special synthetic lubricant, it has been shown that the expected life of the bearing could be increased through occasional lubrication with minimal amounts of grease after several thousand operating hours.

Such relubrication is only practical if fresh grease is applied directly to the rolling bodies and their races since the old grease collects in the cavities and gradually dries out. If the access to the bearing surfaces is positioned unfavourably, fresh grease would carry the old grease onto the rolling bodies and their races, which would not result in effective relubrication. For this reason the relubrication bores are kept very small and lead to the rolling bodies by the shortest route. In order to avoid impeding the running properties in the case of ball bearings, the bore is led radially through the bearing race, tangentially in relation to the balls. The relubricating grease is not itself stockpiled within the connecting rod or on the connecting rod, but is rather delivered to the bearing only at the precise moment of relubrication. Through this, it is ensured that carefully stored grease of fresh quality is employed. The exclusive use of special lubricants is of great importance since the connecting rod big end bearings would be damaged after a few hundred hours if the wrong grease was used. In order to avoid use of the wrong grease, it is advantageous to use unmistakeable and non-refillable lubrication devices. In addition, the relubrication volume must be able to be exactly dosed, since only approximately 1 $Cm^3$ of lubricant is used per bearing and per relubrication. The greasing device can, for example, possess a membrane which is able to be penetrated by an injection needle. Another solution comprises a lubrication device formed as a grease gun with a deposition zone, the lubricant volume of which is able to be reduced with a screw in order to press out the lubricant. Thus, in both cases special aids are required in order to be able to carry out an exactly dosed relubrication. Inspite of this, the relubrication can be carried out without a great effort in the shortest time. This type of relubrication possibility for the rolling bearings can also be provided in connection with conventional connecting rod big ends, respectively connecting rods.

The crank mechanism is particulary easily accessible if the crank case possesses, at least in a section running parallel to the crank shaft, at least one opening which is able to be closed off and through which the big end collars of the connecting rods are accessible. Thus, access to the lubrication points, of which there are, per connecting rod, at least two set at an angle of approximately 75° on the outer circumference, is assured without disassembly of the crankshaft. According to the position of the connecting rod within the V-shaped arrangement of pistons, those lubrication points which are most easily accessible through the opening are equipped with a lubrication device.

An embodiment of the invention is portrayed in the drawings and is more closely described in the following.

Figure 2:
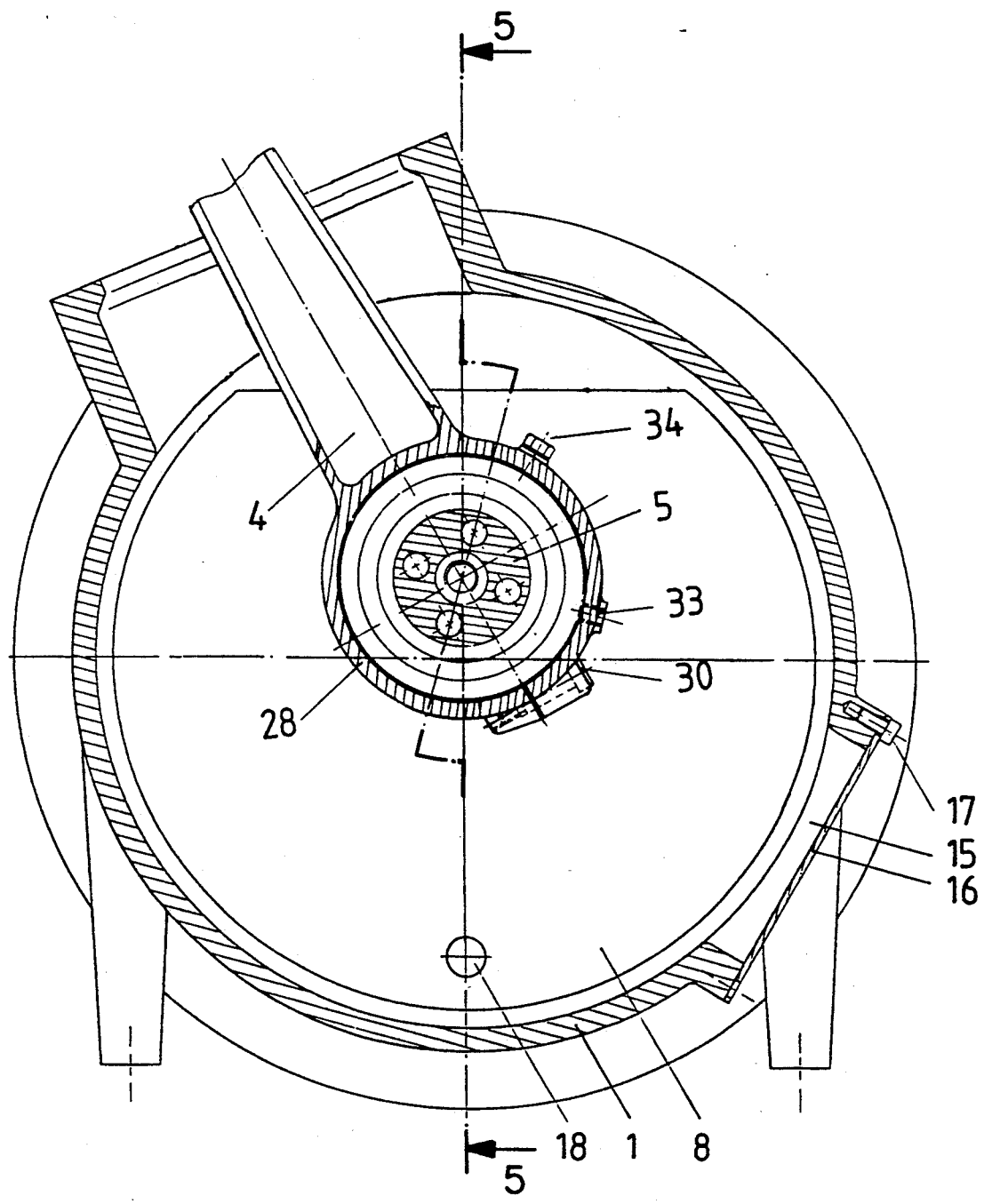

FIG. 1 is a cross-section through the crank case of a piston compressor according to the invention, FIG. 2 is a section through the plane 2—2 on the case according to FIG. 1, FIG. 3 is a cross-section through an individual crank disk, FIG. 4 is a plan view of the crank disk according to FIG. 3, FIG. 5 is a cross-section through the crank case taken on plane 5—5 of FIG. 2, during disassembly of the crank shaft, FIG. 6 is a cross-section through a connecting rod, FIG. 7 a plan view of the big end bearing of the connecting rod according to FIG. 6, and FIG. 8 a lubrication device on the big end collar of the connecting rod.

As can be observed in the FIGS. 1 and 2, the crank case 1, for example manufactured from a casting, has in principle a cylindrical external configuration. Drive, cylinder and control components are not shown in the drawings for reasons of simplicity. Here, conventional components are concerned whose arrangement and form are known to the expert. The cylinders, respectively the cylinder heads, are flanged onto the cylinder openings 50 with the aid of threaded studs and nuts 51. The crank case possesses a bearing mounting integrated into the case wall for the drive shaft 3 which is mounted in a removeable rolling bearing 13. The drive shaft 3 is, for example, directly connected with an electric motor drive, or it is indirectly driven via belts or V-belts. The crank case 1 is closed off in the axis of the drive shaft 3 with a case cover 10 which can be bolted down with the aid of the bolts 14. The case cover 10 is provided with at least one air release port 52 for pressure compensation. In one wall section which runs parallel to the drive shaft 3, at least one opening 15 is arranged which, with the aid of the bolts 17, can be closed off with a cover 16. It would be possible, without further problems, to arrange several of these types of openings on the circumferential area of the crank case. In each case a lubrication hole 33 on the big end collar of the connecting rod 28 is easily accessible via the opening 15. The procedure for lubrication will be described in greater detail in the following.

The crank mechanism arranged within the crank case comprises individual crank disks 5 which, with the aid of tensioning bolts 7, are tightened together to form a package and which are arranged eccentrically to the drive shaft 3. The shape of these crank disks can be observed in more detail in the FIGS. 3 and 4. The crank disks have a wide spigot 21, a narrow spigot 22 and a circumferential spacing shoulder 20 lying between them. The spigots 21 and 22 accommodate the rolling bearings 6, which will subsequently be more exactly described. The spacing shoulder 20 serves as a distancing element between the individual rolling bearings. The crank disks 5 are provided in the centre with a through bore 23 which possesses a threaded section 24. A recess 25, which can acommodate a disassembly disk 26, is arranged at the end of each threaded section. Each crank disk has four through bores 19 for accommodation of the tensioning bolts 7. Naturally, the number of these bores can be changed depending on the diameter of the crank disks. Also the external configuration of the crank disks can be adjusted to correspond to the rolling bearings used. The bores 19 are arranged eccentrically to the centre axis of the crank disks.

As FIG. 1 shows, the crank disks are clamped between a first flywheel 8 and a second flywheel 9. The tensioning bolts 7 are in some cases screwed into the drive shaft and in some cases screwed into the first flywheel 8. The rolling bearings in each case sit simultaneously onto the wide spigot and onto the narrow spigot of neighbouring disks, through which a centering and a distribution of forces takes effect. With that, the individual disks do not touch at their faces, but are, however, pressed together. With the exception of that crank disk which is adjacent to the first flywheel 8, a disassembly disk 26 is loosely inserted into the recess 25 in each crank disk. The first flywheel 8 and the drive shaft 3 can also comprise a single work piece.

The first flywheel 8 has a recess 53 for accommodation of a crank disk, whilst the second flywheel 9 is provided, for the same purpose, with a corresponding protrusion. This protrusion 54 likewise has a bore with a threaded section and a recess for accommodation of a disassembly disk, as do the crank disks themselves. The second flywheel 9 is mounted in bearings on the inside of the case cover 10, in fact on a bearing spigot 11 on which a rolling bearing sits. Both the flywheels 8 and 9 are eccentrically formed in a known way in order to provide mass balancing for the crank shaft. Each flywheel is provided with an assembly bore 18, through which the flywheels can be aligned with one another during assembly at an exact angular congruence with the aid of a ground, marked rod 55. By means of this extremely simple and practical arrangement, retention of the position can be achieved without time consuming wedges, pins or similar between the components being necessary. It is thus ensured, after tightening of the tensioning bolts 7, that the opposing bearing 12 is located exactly in the extended middle axis of the crank shaft bearing 13.

The construction of the connecting rod 4 can be seen in more detail in the FIGS. 6 and 7. The connecting rod has a double-T shaped cross-section and is manufactured, for example, from cast light metal or cast steel. The piston 2 is linked at the upper end in a known way. The piston could, however, also be connected to the connecting rod via a crosshead. The actual big end bearing comprises a big end bearing collar 28 which is provided with a radial slit 29. A tensioning bolt 30 can be screwed into a threaded bore 31 through a bore 32 in the area of the slit. The slit big end collar 28 can clearly be pulled together with the aid of this screw so that it can be clamped onto the rolling bearing 6. The rolling bearing 6 is laterally closed off with a labyrinth ring 36 which is fixed in position by a retaining ring 37. In addition, a labyrinth projection 35 is integrally connected to the big end collar 28. As can be observed from FIG. 1, the labyrinth protrusions and the labyrinth rings engage with each other when assembled and form in this way an additional security against the escape of lubricant from the rolling bearings and the infiltration of dust. The diameter of the labyrinth protrusions and the labyrinth rings is only slightly larger than the outer diameter of the distance shoulders 20 on the crank disks 5.

In the embodiment, a piston compressor with four pistons is portrayed. Correspondingly, the crank mechanism comprises a total or four disks layered together. With a compressor type possessing only three or two pistons, however, exactly the same crank disks can be used for the construction of the crank mechanism, through which the manufacturer of a whole type series can be considerably simplified.

An essential advantage during assembly of the crank mechanism is portrayed in FIG. 5. The drawing shows the crank case according to FIG. 1, with which the case cover 10, together with the second flywheel 9, has already been removed. Likewise, the tensioning bolts 7 and the first and second connecting rods with their crank disks have also been removed. The disassembly of the third crank disk is shown. For this purpose, an auxiliary bolt 27 is screwed into the threaded section 24. This auxiliary bolt comes up against the disassembly disk 26, pressing this against the following crank disk. Without this disassembly disk, obviously the auxiliary bolt will also be screwed into the threaded section of the next crank disk. Rotation of the auxiliary bolt 27 now causes the crank disk with its narrow spigot 22 to be withdrawn from within the inner race of the next rolling bearing. In the same way, all other crank disks can be removed, the auxiliary bolt 27 making contact directly on the first flywheel 8 in the case of the last crank disk. This is also the reason why a disassembly disk does not have to be inserted in the last crank disk. During assembly, an auxiliary screw can likewise be used for pressing in, naturally at least two tensioning bolts being used to balance the loads.

As can be observed in FIG. 7, two eyes 34 are arranged on the outer edge of the big end collar 28, each of which possess a lubrication hole 33 passing right the way through. Depending on the position of the connecting rod within the V-shaped arrangement of the pistons, a lubrication device can be selectively applied to one of these lubrication holes for the relubrication of the rolling bearings. According to FIG. 8, a small lubrication gun 47 is screwed into the lubrication hole 33 on a thread 39. The lubrication gun 47 has a deposition zone 48 into which an exactly dosed special lubricant can be filled by the manufacturing works. The contents of this deposition zone can be forced out by screwing in of the screw 49.

In order to avoid unauthorised or unintentional removal of the screw, the external edge 40 of the lubrication gun is crimped slightly inwards. Apart from that, the screw 49 has a left-hand thread, so that screwing in of ordinary screws is impossible. Thus, the lubrication device is, in its entirety, so designed that relubrication with ordinary grease or the use of an ordinary grease gun is not possible.

The rolling bearing has an outer race 45 which is provided with a fine bore 43 in the area of the lubrication hole 33. In this way, the lubricant can reach the rolling bodies 44 directly, without the old grease layers being displaced. The number 46 depicts the inner race of the rolling bearing.

Naturally, alternative solutions are here conceivable. For example, a fully conventional grease nipple can be employed on the lubrication hole 33. Here, the risk exists, naturally, of improper treatment of the rolling bearings with the wrong dosage or the wrong composition.

I claim:

1. A piston compressor comprising at least two angularly displaced pistons and a crank case within which the pistons are connected via respective connecting rods and a crank mechanism to a common drive shaft, wherein the crank mechanism comprises, for each piston, a separate crank disk which supports a roller bearing at one end of a respective connecting rod, and the crank disks have congruent axes which are eccentric with respect to that of the drive shaft, said crank disks being compressed together into a package by at least two tensioning bolts which pass through the crank disks around their said axes.

2. Piston compressor according to claim 1, characterized in that the crank disks (5) are connected firmly to the rolling bearings (6) and to the connecting rods (4) allocated to them.

3. Piston compressor according to claims 1 or 2, characterized in that the tensioning bolts (7) are screwed into the drive shaft (3) and into a first crank web (8) which is fastened to the drive shaft.

4. Piston compressor according to claim 1 characterised in that the rolling bearings (6) are arranged on the crank disks (5) in such a way that they form centering and spacing elements, and that the pressing force of the tensioning bolts (7) is transmitted through the rolling bearings.

5. Piston compressor according to claims 1 characterized in that each crank disk (5) possesses in its centre a bore (23) with a threaded section (24) which is closed off at its face with an inserted disassembly disk (26), an auxiliary bolt (27), for disassembly of the crank disks, being screwed into the threaded section and being supported against the disassembly disk.

6. Piston compressor according to claims 1 characterized in that the crank case (1) is closed off in the axis of the drive shaft (3) with a case cover (10), the inside of which is formed as a bearing mount (11) for the crank mechanism.

7. Piston compressor according to claim 6, characterized in that a second crank web (9) is mounted in bearings on the inside of the case cover and that the crank disks (5) are fixed and centred in relation to one another between the first and the second crank web.

8. Piston compressor according to claim 7, characterized in that both the crank webs (8, 9) possess an assembly bore (18), for alignment in angular congruence, through which a common rod (55) is inserted before tightening of the tensioning bolts (7).

9. Piston compressor according to claim 1 characterized in that the crank disks are pressed together with four tensioning bolts.

10. Piston compressor according to claim 1 characterized in that each connecting rod (4) possesses, at the crank end, a big end collar (28) with a radial slit (29), and that a clamping bolt (30), running tangentially, is arranged in that area of the slit with which the connecting rod big end collar is clamped around the rolling bearing (6) allocated to it.

11. Piston compressor according to claim 10, characterized in that each connecting rod big end collar (28) possesses, on its outside, at least one radial lubricating hole (33) to which a lubricating device can be applied and via which a lubricant can be transported directly to the rolling bearing (6).

12. Piston compressor according to claim 11, characterized in that the lubricating device is formed as a gun (47) with a deposition zone (48) whose volume is able to be reduced with a screw (49) in order to press out a lubricant.

13. Piston compressor according to claim 10 characterized in that the crank case (1) possesses a closeable opening (15) in a section which runs parallel to the drive shaft, through which the big end collars of the connecting rods are accessible.

14. A piston compressor according to claim 1, wherein the tensioning bolts are screwed into the drive shaft.

15. A piston compressor according to claim 14, wherein the tensioning bolts are screwed into a first crank web which is fastened to the drive shaft.

* * * * *